United States Patent
Kostamovaara

(10) Patent No.: US 9,874,629 B2
(45) Date of Patent: Jan. 23, 2018

(54) DISTANCE MEASUREMENT DEVICE, RECEIVER THEREOF AND METHOD OF DISTANCE MEASUREMENT

(71) Applicant: Oulun yliopisto, Oulu (FI)

(72) Inventor: Juha Kostamovaara, Oulu (FI)

(73) Assignee: OULUN YLIOPISTO, Oulu (FI)

( * ) Notice: Subject to any disclaimer, the term of this patent is extended or adjusted under 35 U.S.C. 154(b) by 497 days.

(21) Appl. No.: 14/563,094

(22) Filed: Dec. 8, 2014

(65) Prior Publication Data
US 2015/0177369 A1 Jun. 25, 2015

(30) Foreign Application Priority Data
Dec. 23, 2013 (FI) ...................................... 20136322

(51) Int. Cl.
| | | |
|---|---|---|
| G01S 7/48 | (2006.01) | |
| G01S 7/486 | (2006.01) | |
| G01S 17/10 | (2006.01) | |
| G01C 3/08 | (2006.01) | |

(52) U.S. Cl.
CPC ............. *G01S 7/4865* (2013.01); *G01C 3/08* (2013.01); *G01S 7/4863* (2013.01); *G01S 17/107* (2013.01)

(58) Field of Classification Search
CPC ........ F41G 7/001; F41G 7/224; F41G 7/2246; F41G 7/2253; F41G 7/2293; G01S 7/499; G01S 7/4818; G01S 7/495; G01S 7/497
See application file for complete search history.

(56) References Cited

U.S. PATENT DOCUMENTS

| | | |
|---|---|---|
| 8,625,081 B2 | 1/2014 | Kostamovaara |
| 2009/0185159 A1 | 7/2009 | Rohner et al. |
| 2010/0252745 A1 | 10/2010 | Hunt et al. |
| 2012/0133921 A1 | 5/2012 | Moore |
| 2013/0208258 A1* | 8/2013 | Eisele .................. G01S 7/4913 356/5.01 |
| 2014/0233942 A1 | 8/2014 | Kanter |

FOREIGN PATENT DOCUMENTS

| | | |
|---|---|---|
| EP | 2 469 301 A1 | 6/2012 |
| WO | WO 2010/149593 A1 | 12/2010 |

OTHER PUBLICATIONS

Finnish Patent Search Report, Patent App. No. 20136322, dated May 23, 2014.
European Search Report for European Appl. No. EP 14 19 7389; Date of Completion of Search: Apr. 17, 2015.

\* cited by examiner

*Primary Examiner* — Luke D Ratcliffe
(74) *Attorney, Agent, or Firm* — Hamilton, Brook, Smith & Reynolds, P.C.

(57) ABSTRACT

A receiver unit includes at least one single photon avalanche detector element of a Geiger mode and a time-to-digital converter circuit. Each single photon avalanche detector element is enabled to detect a photon in at least one time-gated window, and each single photon avalanche detector element is configured to output an electric pulse in response to detection of a photon of optical radiation within the at least one time-gated window. The time-to-digital converter circuit provides timing data associated with said electric pulse for determination of a distance of a target on the basis of the timing data provided by the time-to-digital converter circuit.

20 Claims, 6 Drawing Sheets

DISTANCE MEASUREMENT DEVICE, RECEIVER THEREOF AND METHOD OF DISTANCE MEASUREMENT

RELATED APPLICATION

This application claims priority under 35 U.S.C. §119 or 365 to Finland Application No. 20136322, filed Dec. 23, 2013. The entire teachings of the above application are incorporated herein by reference.

TECHNICAL FIELD

The invention relates to a distance measurement device, a receiver thereof and a method of distance measurement.

BACKGROUND

Pulsed time-of-flight laser distance measurement is based on measuring the time it takes for an optical pulse transmitted from a distanced measuring device to travel to a target and reflect from the target back the distance measuring device. Since the velocity of light is known, the measured time can be converted to a distance between the distance measuring device and the target.

When a SPAD (Single Photon Avalanche Detector) is used as a detector of the distance measurement device, the distance measurement suffers from unreliable results in the prior art. Because the SPAD is very sensitive detector, it may be triggered by background illumination or even by thermal noise. The undesired detections due to random triggers result in wrong timings and wrong distances.

There have been attempts to overcome the problems in the prior art by minimizing the background illumination. That is unfortunately not possible for many measurements and that does not solve the problem related to thermal noise, for example. Additionally, the number of measurements have been increased so much that it has been possible to attempt to separate the wrong detections from the correct detections. That, however, lengthens the measurement time substantially and requires an algorithm that should perform the separation reliably. However, a reliable algorithm has not been found. Thus, the measurement becomes complicated but may not provide more reliability.

Hence, there is need for a better performance of detection.

SUMMARY

The present invention seeks to provide an improved solution. In a first aspect, a receiver unit of an optical time-of-flight distance measuring device comprises at least one single photon avalanche detector element of a Geiger mode and a time-to-digital converter circuit. Each single photon avalanche detector element is enabled to detect a photon in at least one time-gated window, and each single photon avalanche detector element is configured to output an electric pulse in response to detection of a photon of optical radiation within the at least one time-gated window. The time-to-digital converter circuit is configured to provide timing data associated with said electric pulse for determination of a distance of a target on the basis of said timing data.

In a second aspect, an optical time-of-flight distance measurement device comprises a transmitting unit configured to transmit an optical measurement pulse towards a target, a receiver unit, a time-to-digital converter circuit and a processing unit for performing a measurement of a time-of-flight on the basis of a moment of a transmission of the measurement pulse and a moment of a detection of the measurement pulse. The receiver unit comprises at least one single photon avalanche detector element of a Geiger mode; each single photon avalanche detector element is enabled to detect a photon in at least one time-gated window, and each single photon avalanche detector element is configured to output an electric pulse in response to detection of a photon of optical radiation within the at least one time-gated window; the time-to-digital converter circuit is configured to provide timing data associated with said electric pulse, and the processing unit is configured to determine a distance of the target on the basis of the timing data provided by the time-to-digital converter circuit.

In a third aspect, a method of distance measurement includes enabling at least one single photon avalanche detector element of a Geiger mode to detect a photon in at least one time-gated window, each of the at least one single photon avalanche detector element outputting an electric pulse in response to detection of a photon of optical radiation within the at least one time-gated window; determining timing of said electric pulse by a time-to-digital converter circuit; and determining, in the measuring unit, a distance of the target on the basis of the timing of said electric pulse provided by the time-to-digital converter circuit.

The preferred embodiments of the invention are disclosed in the dependent claims.

Embodiments of the present disclosure provide a better performance associated with detection in distance measurement based on time-of-flight ranging by limiting possibilities of wrong and random detections.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in these Figures may refer to logical or physical connections. It is apparent to a person skilled in the art that the described apparatuses may also comprise other functions and structures. It should be appreciated that details of some functions and structures used for measurement and signalling are irrelevant to the actual invention. Therefore, they need not be discussed in more detail here. Although separate single entities have been depicted, different parts may be implemented in one or more physical or logical entities.

In the present application, optical radiation refers to electromagnetic radiation at wavelengths between 40 nm to 1 mm. One or more narrow or broad bands of the optical radiation may be utilized.

Figure 1:
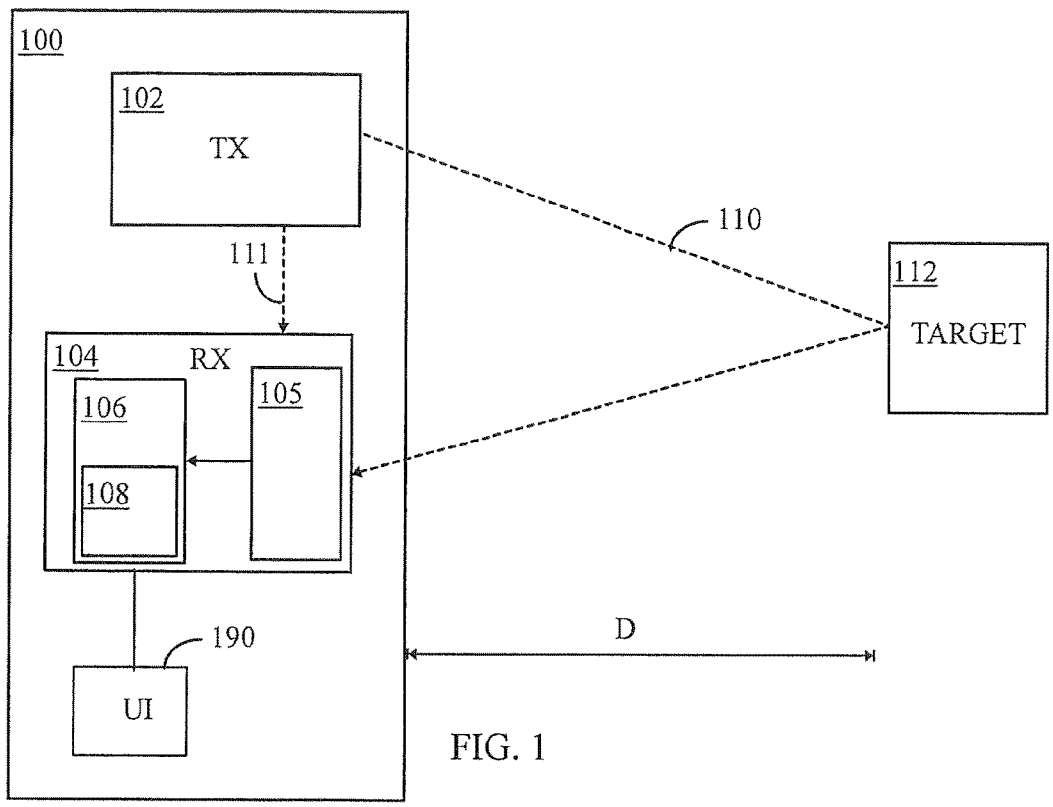
FIG. 1 illustrates an example of a distance measurement apparatus.

In FIG. 1, a block diagram of an apparatus 100 for measuring a distance D between the apparatus 100 and a target 112 on the basis of time-of-flight of an optical pulse is shown. The apparatus 100 may be, for example, a pulsed laser distance measuring device or any apparatus capable of measuring a distance by transmitting and receiving at least one optical pulse. In FIG. 1, only the logical elements required for understanding the structure of the apparatus 100 are shown. Other components or elements have been omitted for reasons of simplicity. It is apparent to a person skilled in the art that the apparatus 100 for measuring a distance to the target 112 may also comprise other functions, components and structures. Moreover, the connections shown with solid lines in FIG. 1 are logical connections, and the actual physical connections may be different.

The distance measurement apparatus 100 may comprise a transmitter 102 that may transmit an optical pulse 110 towards the target 112, a receiver unit 104 that may receive the optical pulse 110 reflected from the target 112, and a measuring unit 106 that may measure a time interval between the transmission and reception of the optical pulse 110. The transmitter 102 may comprise a pulsed laser which may transmit short optical pulses. The laser may comprise a vertical-cavity surface-emitting laser (VCSEL) element or a VCSEL array, for example. The duration of the optical pulses may range from a picosecond to tens of nanoseconds, for example. As an example, the optical pulse width may be about 100 ps, for example. The power of the pulse may range from one watt to hundreds of watts, for example. As an example, the power of the optical pulse may be about 20 W, for example.

The measuring unit 106 may be a part of the receiver unit 104 or it may be outside of the receiver unit 104. The reception may be based on detection of amplitude crossing a predefined amplitude threshold level. In general, the reception may be based on any suitable property crossing a predetermined threshold. The determination whether the property crosses the predetermined threshold may be performed digitally or analogically.

The optical pulse 110 transmitted from the transmitter unit 102 is shown in a dotted line. The transmitter unit 102 and the receiver unit 104 may be connected such that the optical pulse 110 transmitted towards the target 112 may also be simultaneously transmitted to the receiver unit 104 as well. The optical pulse 110 may pass from the transmitter unit 102 to the receiver unit 104 through a diffuse or non-diffuse channel. The optical pulse 110 may be transmitted to the receiver unit 104 via a mirror, a lens, a prism or the like that directs part of the optical pulse 110 transmitted towards the target 112 to the receiver unit 104 as a reference pulse 111, or the transmitter unit 102 may directly transmit another electrical or optical pulse to the receiver unit 104 as the reference pulse 111. The reference pulse 111 has a determined temporal dependence on the optical pulse transmitted towards the target 112. That is a moment of the transmission of an optical pulse towards the target 112 and it is a timing signal for a measuring unit 106 to start measuring time between the transmission and reception of the optical pulse.

The transmitter unit 102 may transmit optical pulses repeatedly. The repetition may be regular or irregular. The repetition may have a certain frequency, for example. Duration of each optical pulse may be about 100 ps, for example. In general the duration of an optical pulse may vary from femtoseconds to nanoseconds, for example. Depending on the application, the duration may be even smaller than 100 ps or larger than nanoseconds.

The receiver unit 104 may comprise a detector 105 that detects the optical pulse 110 reflected from the target 112. The detector 105 may also detect the reference pulse 111. The detector 105 may have one or more detector elements. The detector 105 may comprise an array of detector elements. The target 112 may be any object that reflects at least part of the optical pulse 110 back in the direction of the receiver unit 104.

When the receiver unit 104 receives the optical pulse 110 reflected from the target 112, the time of the arrival of the optical pulse 110 may be the time when the detector 105 detects it. A pulse of the reflection from the target 112 is a timing signal for the measuring unit 106 to stop measuring time between the transmission and the reception of the optical pulse.

Similarly, the time of the transmission of the optical pulse 110 by the transmitter 102 may be detected correspondingly by the detector 105 from the optical or electrical reference pulse 111 received by the receiver unit 104.

As explained, the apparatus 100 may comprise the measuring unit 106 for measuring the time interval between the transmission and the detection of the optical pulse 110. The detector 105 and the measuring unit 106 may be connected such that the detector 105 may inform the measuring unit 106 about the arrivals of the pulses 110, 111 and the measuring unit 106 may determine their timing.

The measuring unit 106 may comprise a time-to-digital converter circuit, at least one digital signal processor and memory 108 provided with suitable software embedded on a computer readable medium, or by separate logic circuits, for example with an application specific integrated circuit (ASIC). The measuring unit 106 may comprise an input/output (I/O) interface, such as a computer port for providing communication and signalling capabilities. The measuring unit 106 may comprise a clock for synchronized operation, timing the detections of optical pulses on the basis of electrical pulses from the detector 105 and measuring time related to transmission and reception moments of optical pulses.

Figure 2A:
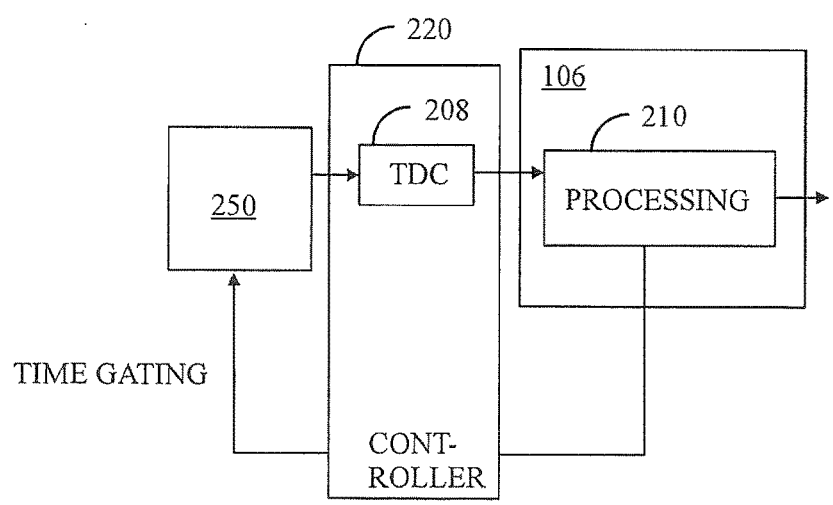
FIG. 2A illustrates an example of a detecting configuration with one detector element.

FIG. 2A presents the detector 105 which may comprise one single photon avalanche detector element (SPAD) 250. The SPAD element 250 outputs a single electric pulse in response to a single photon of the optical radiation hitting the element. The SPAD element functions in a Geiger-mode. The SPAD element may be realized using integrated circuits technology. The SPAD element 250 may comprise CMOS (Complementary Metal Oxide Semiconductor) device. A response time for a SPAD element may be tens of picoseconds, for example. As an example the response time for a SPAD element is about 50 ps. The dead time may be 5 ns to 50 ns, for example.

The electrical pulse from a SPAD 250 may be a unipolar pulse. The pulse may be of any shape such as rectangular or round. The electric pulse may last for about a few nanoseconds, for example. However, the duration of the pulse may vary about 1 picosecond to about a few nanosecond, for example. In an embodiment, the duration of the pulse may be about 100 picosecond, for example.

The receiver unit 104 comprises a controller 220 which controls the timing of time-gated windows and provides timing for the detected optical pulses on the basis of electrical pulses from the SPAD 250. The time-to-digital converter circuit 208 may determine timing of the time-gated windows 400 and provide timing data associated with said electric pulse on the basis of the timing of a time-gated window 400 during which said electric pulse is output from the SPAD 250.

The receiver unit 104 comprises a TDC-circuit (Time-to-Digital Converter) 208 for providing timing data associated with the at least one electric pulse. The TDC-circuit 208 and the measuring unit 106 may be in a common entity or they may be separate. The TDC-circuit 208 may comprise an oscillator and a counter which counts the number of oscillations between the transmission of an optical pulse (START) and the reception of the optical pulse (STOP) for determining the time of flight. The TDC-circuit 208 may also interpolate timing within the oscillations for further accuracy if an integer number of oscillations do not occur between the START and STOP. The TDC-circuit 208 is known per se.

Figure 5A:
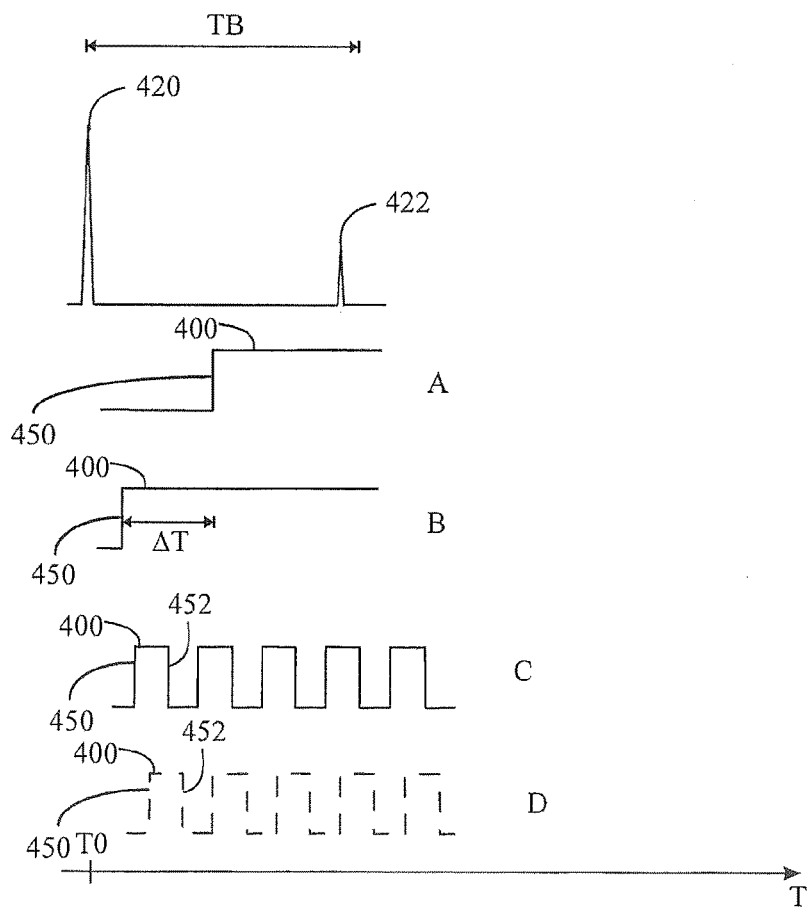
FIG. 5A illustrates examples of time-gating for a single optical measurement pulse and time-gating for a plurality of successive optical measurement pulses.
Figure 5B:
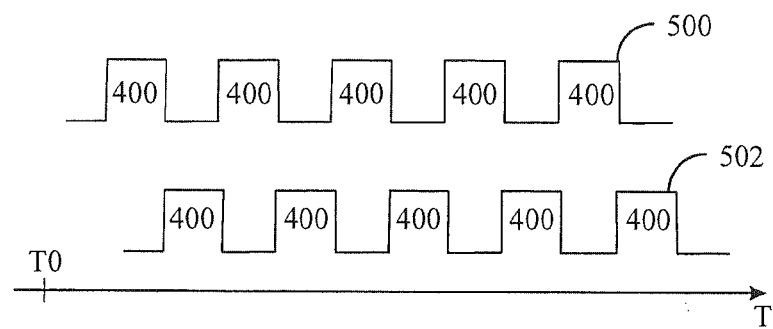
FIG. 5B illustrates examples of opposite phased time-gate window sequences.

The single photon avalanche detector element 250 is enabled to detect a photon in at least one time-gated window 400 by a controller 220 of the measuring unit 106 (see FIGS. 5A and 5B). The enablement of the single photon avalanche detector element 250 means that the single photon avalanche detector element 250 is switched into a Geiger mode from a non-Geiger mode. The time-gated window may have a starting moment at which the Geiger mode of the at least one detector element is switched on but not necessarily any specific ending moment which switches off the Geiger mode. However, the time-gated window may also have both a certain starting moment and an ending moment i.e. the Geiger mode may last only a known period of time. The number of successive and non-overlapping time-gated windows may be one or more for one laser shot. The measuring unit 106 may enable the single photon avalanche detector element 250. The single photon avalanche detector element 250 outputs an electric pulse in response to detection of a photon of optical radiation within the at least one time-gated window 400. The time-to-digital converter circuit 208 may provide timing data associated with said electric pulse when the pulse takes place in the time gated window 400. The processing unit 210, which is included in the measurement unit 106, may then determine a distance of the target 112 on the basis of the timing data provided by the time-to-digital converter circuit 208. The measurement unit 106 may determine the timing data on the basis of the moment(s) when the time-gated window(s) 400 are active for detections (see FIGS. 5A and 5B). The timing of the time-gated window(s) 400 is determined by the time-to-digital converter 208.

Figure 2B:
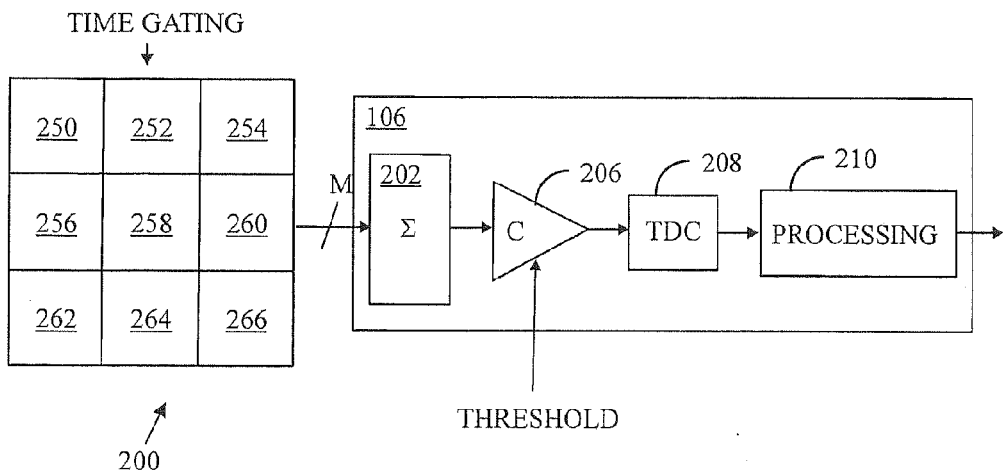
FIG. 2B illustrates an example of a detecting configuration with a plurality of detector elements.

In an embodiment shown in FIG. 2B, the receiver unit 105 comprises an array 200 of time-gated single photon avalanche detector elements 250 to 266 of the Geiger mode, a summating unit 202 and a comparator 206. The array 200 in FIG. 2B comprises a matrix with nine elements arranged in three rows and three columns. In general, the array 200 may have at least two elements. The array 200 may generally have the same number of rows and columns or a different number of rows from columns. The array 200 may not be in a matrix form but may comprise a column or a row alone. In any case, the array 200 has more than one detector element.

Each of the single photon avalanche detector elements 250 to 266 of the array 200 outputs a single electric pulse in response to a single photon of the optical radiation hitting the element. The SPAD elements may be realized using integrated circuits technology. Each of the SPAD elements may comprise CMOS (Complementary Metal Oxide Semiconductor) device. The whole array 200 may be made on one semiconductor chip. However, it is possible that the array 200 comprises more than one semiconductor chip.

The summating unit 202 may combine the electric pulses from the detector elements 250 to 266. The summation unit 202 may combine concurrent electric signals of the detector elements 250 to 266. If the electric pulses are at least partly temporally overlapping, they are concurrent. That is, electric pulses which coexist within duration of an electric pulse can be considered concurrent. The comparator 206 may determine that a measurement pulse for measuring a distance of the target 112 is detected if the combination of the electric pulses crosses a predetermined threshold 310. The time-to-digital converter circuit 208 may provide timing data associated with the combination of the electric pulses such that the processing unit 210 may determine the distance of the target 112 on the basis of the timing data provided by the time-to-digital converter circuit 208.

The summating unit 202 may receive the M outputs of the detector elements 250 to 266. The summating unit 202 may combine or summate the M electric pulses of all the detector elements 250 to 266 for forming a summated signal. The combination is performed in a synchronous manner such that the electric pulses are not temporally processed or delayed with respect to each other. That is, they are summated with respect to the moments they occur. Then the comparator 208 may determine that the measurement pulse for measuring a distance of the target 112 is detected if the combined signal crosses a predetermined threshold.

In general, the predetermined threshold of the comparator 206 may be set electrically. The threshold can be set to a suitable level on the basis of experiments, simulation or theory. The measuring unit 106 may set the threshold. A user may input the threshold through a user interface or the measuring unit 106 may calculate a suitable threshold on the basis of measurements. The threshold 310 may be any threshold chosen such that the amount of false detections is low enough for the current application.

In an embodiment, the measuring unit 106 may determine a distance of the target 112 on the basis of the time-of-flight of the measurement pulse associated with the distance between the measurement device and the target 112.

In more detail, a processing unit 210 of the measuring unit 106 may process the combined signal, determine the number or strength of the combined signal and determine timing of the measurement pulse if the combined signal crosses the predetermined threshold.

The array 200 may detect an optical pulse transmitted towards the target 112 for determining a start moment T0. Instead of array 200 there may be some other detector element or detector array which detects the optical pulse transmitted towards the target 112 for determining a start moment T0. However, the one detector or array is integrated in the same chip with the array 200. The array 200 may also be considered to mean an array structure which comprises the arrays. The array 200 may detect an optical pulse reflected from the target 112 for determining a stop moment. Because the reflected pulse from the target 112 is usually weak, its detection suffers from random triggers and this kind of statistical processing minimizes essentially the number of wrong and random thermal and background triggers in the distance measurement and thus makes the distance measurement more reliable.

If the combination of the electric pulses of a reflected optical pulse crosses the predetermined threshold, the TDC 208 may provide the timing data of the combined signal. The combined signal may be caused by a transmitted optical pulse or an optical pulse received as a reflection from the target 112.

Figure 2C:
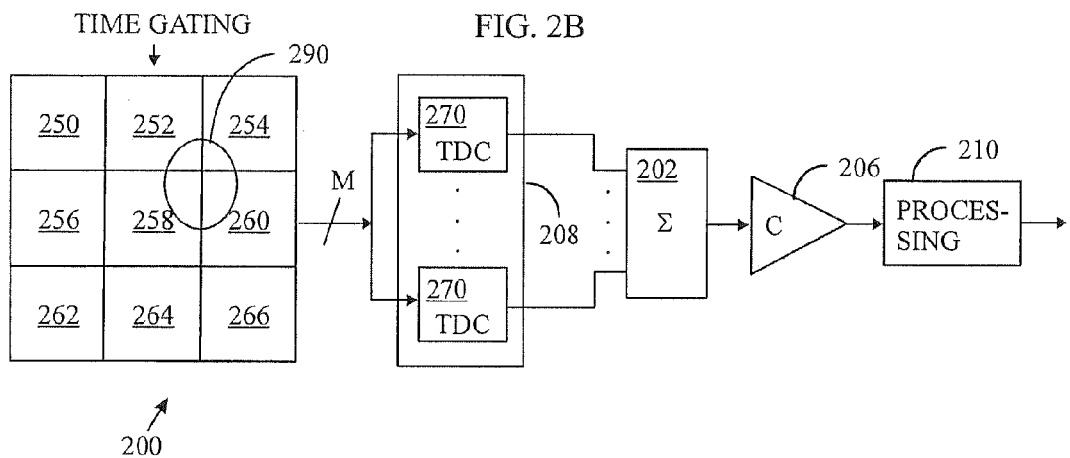
FIG. 2C illustrates another example of a detecting configuration with a plurality of detector elements.

In an embodiment shown in FIG. 2C, the TDC circuit 208 may comprise more than one TDC unit 270. Each TDC unit 270 may provide timing for one or more detector elements 250 to 266. In an embodiment, each detector element 250 to 266 feeds its electric signal to one TDC unit 270. The summation unit 202 may summate concurrent timings of the electric signals of the detector elements 250 to 266. If the electric pulses are at least partly temporally overlapping, they are concurrent. If the number of concurrent timings cross the threshold, it may be determined that a measurement pulse for measuring the distance of the target 112 is detected.

Figure 3:
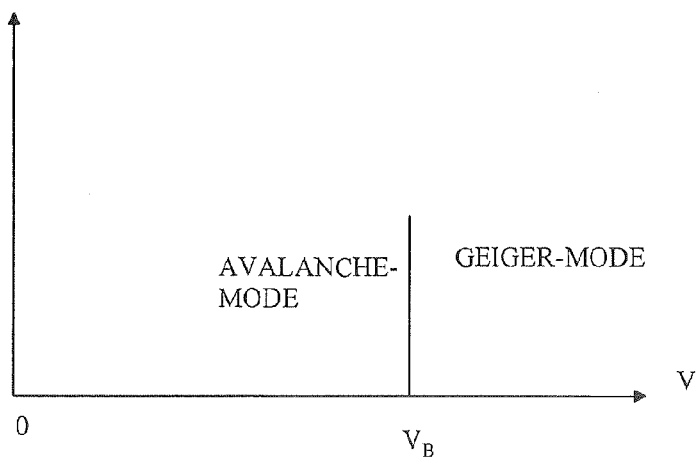
FIG. 3 illustrates an example of division between an avalanche mode and a Geiger mode of the detector element.

FIG. 3 presents an avalanche-mode and the Geiger-mode. The at least one detector element 250 to 266 may be made of semiconducting material and have a p-n junction which is reverse biased. In the avalanche-mode, the biasing voltage over the p-n junction is below a breakdown voltage $V_B$. The amplification in the avalanche-mode is the higher the closer the biasing voltage is to the breakdown voltage $V_B$. In the Geiger-mode, the biasing voltage over the p-n junction is above the breakdown voltage $V_B$. In the avalanche-mode, the intensity of the electrical output of the at least one detecting element 250 to 266 depends linearly on the optical radiation i.e. the number of detected photons. To make the detection of photons more effective, the Geiger-mode may be used. In the Geiger-mode, the response of the at least one detecting element 250 to 266 to optical radiation is non-linear and a single photon may cause the diode to output a strong electrical pulse. The amplification of a detector element in the Geiger-mode can be considered infinite which is substantially different from linear amplification of the avalanche-mode.

Figure 4:
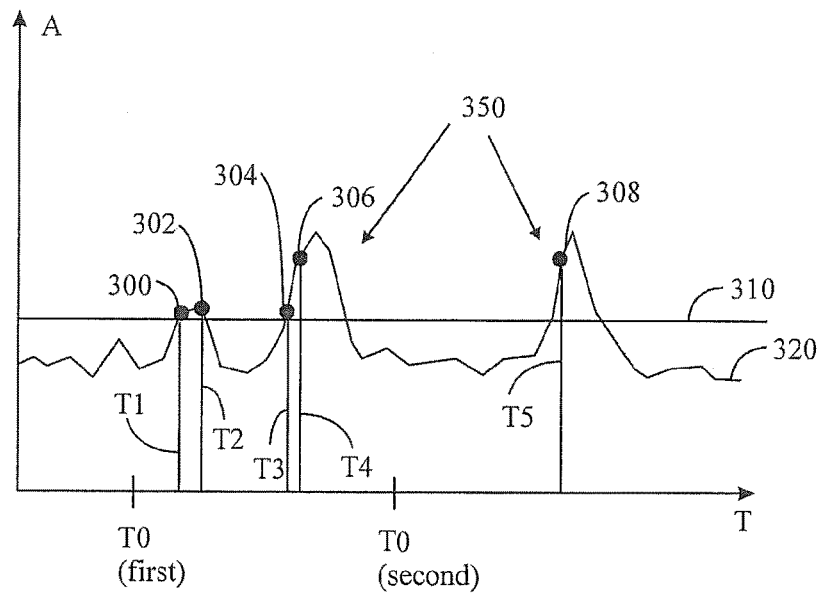
FIG. 4 illustrates an example of combined pulses output by an array of detector elements.

In FIG. 4, y-axis denotes strength A and x-axis denotes time T, and the summation of the electric pulses from the detector elements 250 to 266 as a function of time T is shown with the curve 320. The summation may refer to signal strength and/or number. FIG. 4 presents a situation where a reflection of the measurement pulse is received from the target 112. The detection of the transmission of the optical measurement pulse may be performed correspondingly. The moment T0 represents the moment of the transmission of the measurement pulse.

In an embodiment according to FIG. 4, the summated signal 320 has amplitude 300 at a moment T1 and amplitude 302 at a moment T2 where the moments T1 and T2 are two successive moments. In general, the number of moments may be larger than two. It may then be determined in the receiver unit 104 that the measurement pulse is detected if the combined amplitude 300 of the summated signal at a second moment T2 is higher than that 300 at a first moment T1, the amplitude of the summated signal at both moments T1, T2 crosses the predetermined threshold 310 and a slope between the successive moments T1, T2 crosses a predetermined slope threshold. The slope threshold may be determined on the basis of theory, simulation and/or experience. That is, a rise time of the summated signal 320 is assumed to be much steeper when the measurement pulse is detected than that of a random pulse caused by background noise. The reason for that is that all or many detector elements 250 to 266 output electric pulses when they detect the measurement pulse but a probability that such a number of detector elements 250 to 266 output an electric pulse accidentally at about the same time i.e. concurrently is very low.

In an embodiment, one detector element 250 or the array 200 of the detector elements 250 to 266 may start to detect at a certain moment. Additionally, the at least one detector element 250 to 266 may stop to detect at another moment. The time, when the detection is performed, is a time-gated window 400. The time-gated window may repeatedly be activated during a distance measurement to enable detections of photons. In this manner, the at least one detector element 250 to 266 is time-gated to be only periodically active which reduces the disturbance of the background noise. A controller 220, which may be a part of the measuring unit 106, may be used to control this kind of time-gating of the detecting elements 250 to 266. The time gating may be performed such that to make the at least one detector element 250 to 266 active for Geiger detection the operation voltage is raised above the breakdown voltage $V_B$ for enabling the Geiger-mode. To deactivate the at least one detector element 250 to 266 the operation voltage is lowered below the breakdown voltage $V_B$ for disabling the Geiger mode.

In an embodiment, the controller 220 may control on the basis of time-gating detector elements 252, 254, 258, 260 (see FIG. 2C) which receive the light 290 from the target 112. The rest of the detector elements may be ignored. In general, the number of time-gated detector elements may be one element, two elements, . . . or all elements of the array 200. Different detector elements may be time-gated in an active detection mode at different moments after an optical pulse has been transmitted during the expected reception period of reflection from the target 112, and/or the detector elements which are time-gated in the active mode may vary from one optical pulse to another, for example.

In an embodiment, the optical system of the receiver unit 104 may have been designed such that a position of a spot of light received from the target 112 on the array 200 depends on or is a function of the distance of the target 112. That is, the spot of light moves on the array with a changing distance. In an embodiment, one detector element may be time-gated at one moment and another detector element may be time-gated at another moment. Similarly, one group of detector elements may be time-gated at one moment and another group of detector elements may be time-gated at another moment. In an embodiment, different detector elements or different groups of detector elements are separately and successively enabled in time-gated windows with respect to transmission of one optical pulse. That is, the detector elements of the array 200 are successively scanned through with a speed which corresponds to the speed the optical pulse propagating in the measured distance range.

The time-gating of the detector elements or the groups of detector elements may be performed successively in the order and in the direction according to which the spot of light would or will reflect from the target 112 on the array 200 as a function of increasing distance from the target 112. In an embodiment, a detector element or a group of detector elements is enabled in a time-gated window with respect to a transmission of an optical pulse and another detector element or another group of detector elements is enabled in a time-gated window with respect to a transmission of another optical pulse. That is, a detector element or a group of detector elements may be time-gated to be active after one period of time from a transmission of an optical pulse, and another detector element or another group of detector elements may be time-gated active after another period of time from the transmission of another optical pulse.

The controller 220 may also synchronously time-gate the processing unit 210 such that the processing of the electric pulses is performed only between a command to start processing and a potential command to stop processing. No processing of electric pulses is performed after a command to stop processing is received from the controller 220.

In an embodiment, the transmitting unit 102 transmits measurement pulses 420 repeatedly. Each moment of transmission may be determined to be T0 and each such moment may start the time measurement.

The at least one detector element 250 to 266 may be time-gated such that the at least one detector element 250 to 266 has at least one time-gated window 400 and the summating unit 202 summates the concurrent electric pulses during each of the at least one time-gated window 400. That is, the summating unit 202 summates concurrent electric pulses from all the detector elements 250 to 266 separately in the at least one time-gated window 400. The time-gated window which has detections or more detections than a predetermined threshold provides timing information for the detections. The accuracy of timing of the detections may further be enhanced with the TDC 208 which may provide a refined timing of the detections within the time-gated window 400. That increases resolution of the measurement. The window 400 determines the measurement time within which the electrical pulses are summated. That is, the electric pulses of different time-gated windows are not combined. The concurrent electric pulses are summated within each one of the time-gated windows 400 if more than one window 400 is used (see FIG. 5A, case C).

FIG. 5A illustrates time gating. The axis refers to time T. TDC-circuit 208 provides timing data associated with the electric pulse which is performed inside the time gating window 400. The time gating window 400 may be switched on at or after the laser shot of the optical measurement pulse 420, for example. The window 400 may have a starting moment 450 when the at least one detector element 250 to 266 is switched into a Geiger mode but the window 400 may not have any particular ending moment. Alternatively, the window 400 may be like a pulse with a starting moment 450 and an ending moment 452. The Geiger-mode of the at least one detector element 250 to 266 is switched off at the ending moment 452.

The time gated window 400 may start at a certain moment for a first optical measurement pulse 420 (case A). While using adapted time gating, the time gated window 400 may be shifted such that the time gated window 400 of a next optical measurement pulse 420 covers a different time span (case B). The at least one detector element 250 to 266 may be switched on into the time gated window 400 of the Geiger mode after a maximum delay for the first optical measurement pulse 420. After that the time gated window 400 may be shifted gradually closer to the moment of transmission of the optical measurement pulse 420 each time the optical measurement pulse 420 is transmitted. The shift associated with the time gated windows 400 between two transmissions of the optical measurement pulse may be ΔT. Alternatively, the time gated window 400 may be shifted gradually from the minimum delay related to the moment of transmission of the optical measurement pulse 420 temporally farther each time the optical measurement pulse 420 is transmitted (cases A and B in reversed order). The minimum delay may include the moment of transmission of the optical measurement pulse 420.

Often the at least one detector element 250 to 266 may have so much background photons that the at least one detector element 250 to 266 becomes saturated if the time gated window 400 is half open i.e. the time gated window 400 has no particular ending moment.

If the time gated window 400, which has both the starting moment and the ending moment, is provided only once for each transmitted optical measurement pulse, the measurement of distance of the target 112 may take TB/(TM*FP), where TB is the time between the moment of transmission of the optical measurement pulse 420 and the moment of the detection of the reflection 422 of the optical measurement pulse from the target 112, TM is the duration of the time-gated window 400, and FP is the repetition rate of the optical measurement pulses 420. The time gated window 400 may be shifted by ΔT which may be the same as TM=2 ns, for example. TB could be about 67 ns, for example (about 10 m) and the repetition rate FP could be 1 MHz. Then the time to measure the distance of the target 112 could take about 33 μs. It may be so that the background noise is so high that the time-gated window 400 cannot be longer than 2 ns i.e. after 2 ns the at least one detector element 250 to 266 becomes saturated and cannot be used to make reliable detections.

In an embodiment, the time-gated window 400 for the detector elements 250 to 266 may be performed repeatedly which is shown in FIGS. 5A and 5B with a row of time-gated pulse-formed windows 400 (cases C and D in FIG. 5A). The repetition rate of the time-gated windows 400 may be, in principle, chosen freely. The repetition rate of the time-gated windows 400 may be based on the recovery time of the detector elements 250 to 266 of the SPADs in the Geiger-mode. The recovery time may be about 2 ns to 50 ns, for example. The time required for determining the distance is very effective in this manner.

In an embodiment, the TDC circuit 208 does not necessarily interpolate timing within counted oscillations because the duration of the short time-gated windows 400 may be shorter than or as short as a required temporal resolution of the measurement. That is, when at least one photon of the transmitted or reflected light is detected in one of the time-gated windows 400, the time, when the time-gated window is active, is known because the TDC circuit 208 of the controller 220 of the measuring unit 106 controls the starting and stopping moments of the time-gated windows 400. The duration of the time-gated window determines the inaccuracy of the measurement, but as already mentioned, it may be within the required temporal resolution of the measurement. In this manner, the measuring unit 106 may determine the temporal data of the detections of the transmitted and/or reflected optical pulse directly on the basis of control of the time-gated windows 400 or on the basis of the refined interpolation of the TDC 208.

The repetitive activation and deactivation of the at least one detector element 250 to 266 enables reduction of thermal and environmental noise. Each element of detector 105 is in an active state during the time window 400 of the time gating, because the deactivation period of the time gating recovers all the detector elements. The time required for determining the distance may also be very short. The time required for determining the distance may be about 30 ns, for example, based on the assumption above.

The fastest result is received if the reflected pulse 422 does not occur during the recovery time of the at least one detector element 250 to 266 but occurs during the time-gated window 400. If the reflected pulse 422 occurs during the recovery time of the at least one detector element 250 to 266, the time gating sequence should be shifted for one or more measurement following the first measurement (see the sequence of case D drawn with dashed line in FIG. 5A). The shift may be about the same as the length of the time gated window 400 or its multiple. The shift may be increased for transmitted optical pulse after transmitted optical pulse so long that the reflected optical pulse 422 is detected. The shifting may be performed in a determined manner or in a random manner.

FIG. 5B illustrates an example of a measurement with time-gated window sequences 500, 502 which have opposite phases. If the reflected pulse 422 occurs outside the time-gated window 400 of the sequence 500, the time-gated window sequence 502 with opposite phase will detect a reflected pulse 422 (or a transmitted pulse). In this manner, the distance to the target 112 may be determined with only two measurements. If the temporal resolution of the time-gated windows 400 is adequate, the refined interpolation of the TDC circuit is not needed for determining the timing of the reflected pulse (or the transmitted pulse).

Figure 6A:
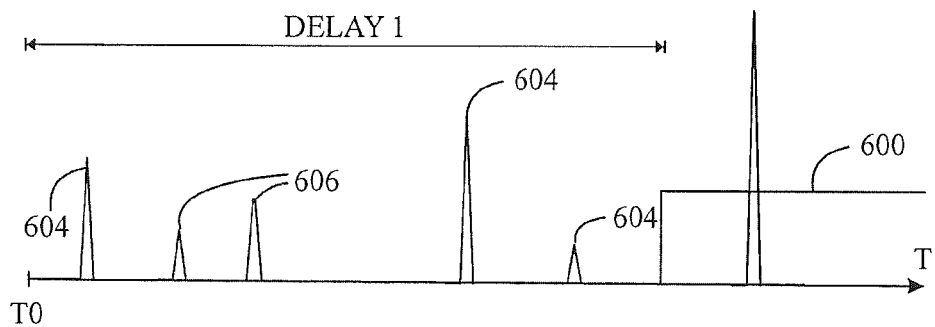
FIGS. 6A and 6B illustrate examples of time-gating.
Figure 6B:
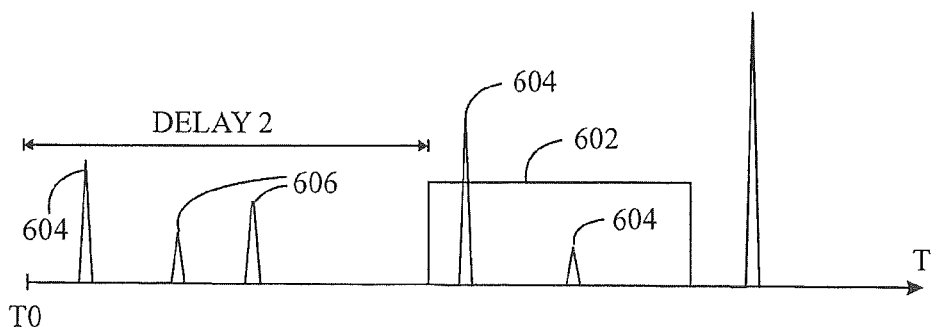

FIGS. 6A and 6B show another example of the adaptive time-gating. FIGS. 6A and 6B may illustrate the time gated windows for two successive optical measurement pulses. The axis refers to time T. For example, the Geiger mode of the at least one detector element 250 to 266 may be switched on after a predetermined delay DELAY 1 from the moment T0 of the transmission of the optical measurement pulse in FIG. 6A. The Geiger mode of the at least one detector element 250 to 266 may be switched on after a predetermined delay DELAY 2 from the moment T0 of the transmission of the measurement pulse in FIG. 6B. The first delay DELAY 1 is longer than the second DELAY 2. The length of the delay may be set on the basis of the estimated distance to be measured. After the delay DELAY 1, DELAY 2 has gone, the detector elements 250 to 266 are capable of detecting and the summation of electric pulses may also be formed. That may be performed during time gated windows 600, 602. The reflections 604 do not cause background noise when the DELAY 1 is used but said reflections 604 cause background noise when DELAY 2 is used. In this manner, the background reflections 604, 606 during the adaptively chosen delay DELAY 1 have no effect to the detector elements 250 to 266 and to the measurement results.

Detecting optical radiation in a time-gated mode filters the background noise out effectively, since outside the time gated window 400, 600, 602 no optical pulses are taken into account in the measurement. No electric signals are taken into account either. Between the time-gated windows and optical measurement pulses the at least one detector element 250 to 266 can recover if they have been triggered by the background noise. That is an advantage over the prior art. The background noise may include thermal noise generated in the measuring system and background light (sunshine, lamplight etc.) hitting the detector elements 250 to 266 of the measuring system.

In an embodiment, the predetermined threshold 310 is based on at least one of the following: background optical radiation received by the array 200 and noise of the array 200. The predetermined threshold level 310 may be equal to or higher than N concurrent outputs made by the detector elements 250 to 266, where N is 2 to M, M being the number of detector elements 250 to 266 in the array 200. The predetermined threshold level 310 may be equal to or higher than summated strength of N concurrent outputs made by the detector elements 250 to 266, where N is 2 to M, M being the number of detector elements 250 to 266 in the array 200.

In an embodiment, the summating unit 202 may summate the number of the concurrent electric pulses of all detector elements 250 to 266, and may determine that a measurement pulse is detected if the sum of the number of the electric pulses crosses the predetermined number threshold 310.

If the power of the background illumination is assumed 1 nW, it causes false triggers in the detector elements 250 to 266 of the array 200 the intervals of which is about 200 ps. In general, the intervals depend on the detection probability of the detector element 250 to 266. Because the electric pulses of the detector elements 250 to 266 have duration from 100 ns up to a few nanoseconds, the pulses triggered in that interval are concurrent. If the array 200 comprises 100 detector element 250 to 266 (10×10 matrix, for example) and the duration of a laser pulse is 1 ns, for example on average 5 detector elements trigger concurrently and thus output electric pulses because of the background illumination. The measuring unit 106 may now determine that the measurement pulse is detected if the number of the concurrent electric pulses crosses the number of concurrent false triggers i.e. number of false electric pulses output by the array 200 or a larger value. The threshold may be set to 20, for example, in order to guarantee a very reliable determination of the measurement pulse. In general, the number FTR of background noise triggers during the optical pulse may be calculated in the following manner: FTR=TP/TB, where TP is the duration of the optical pulse and TB denotes the interval of false triggers because of background illumination and thermal noise. The FTR determines the lowest value for the predetermined threshold 310. In this manner, it is possible to realize an accurate and simple receiver 104 which can tolerate high background illumination and thermal noise.

In an embodiment, the summating unit 202 may combine strengths of the electric pulses of all detector elements 250 to 266, and the measuring unit 106 may determine that a measurement pulse is detected if the combination of the strengths of the concurrent electric pulses crosses the predetermined strength threshold 310.

In an embodiment, the measuring unit 106 may determine that the measurement pulse for measuring a distance of the target is detected if the summation of the concurrent electric pulses crosses a predetermined integral threshold. The summation of the electric pulses in this example refers to integration over the electric signals. The integration may result in power of the pulse 350 of the combined signal 320. Thus, the pulse of the summated signal 320 may need to be higher than the integral threshold 310.

In an embodiment, the strength is at least one of the following: current amplitude and voltage amplitude.

The summation of electric pulses may be done in various ways. Currents from different detector elements 250 to 266 may be summated in the summating unit 202 by a current amplifier, for example. An example of a component capable of combining currents is a current mirror which summates the currents. The summated currents may be processed analogically. Alternatively, the summated currents may be processed digitally. Voltages may be combined in a similar manner. The currents from the detector elements 250 to 266 may be made to go through a resistor or the like, and a voltage may be measured over the resistor, for example.

The measurement device comprises a transmitting unit 102, which transmits an optical measurement pulse towards a target 112, a receiver unit 104, a time-to-digital converter circuit 208 and a processing unit 210 for performing a measurement of a time-of-flight on the basis of a moment of a transmission of the measurement pulse and a moment of a detection of the measurement pulse. The receiver unit 104 comprises at least one single photon avalanche detector element 250 to 266 of a Geiger mode. Each single photon avalanche detector element 250 to 266 is enabled to detect a photon in at least one time-gated window 400. Each single photon avalanche detector element 250 to 266 outputs an electric pulse in response to detection of a photon of optical radiation within the at least one time-gated window 400. The time-to-digital converter circuit 208 of the receiver unit 104 provides timing data associated with said electric pulse. The processing unit 210 of the receiver unit 104 determines a distance of the target on the basis of the timing data provided by the time-to-digital converter circuit 208.

In an embodiment, the measuring unit 106 determines the distance of the target on the basis of the time-of-flight of the measurement pulse associated with the distance D between the measurement device 100 and the target 112.

Figure 7:
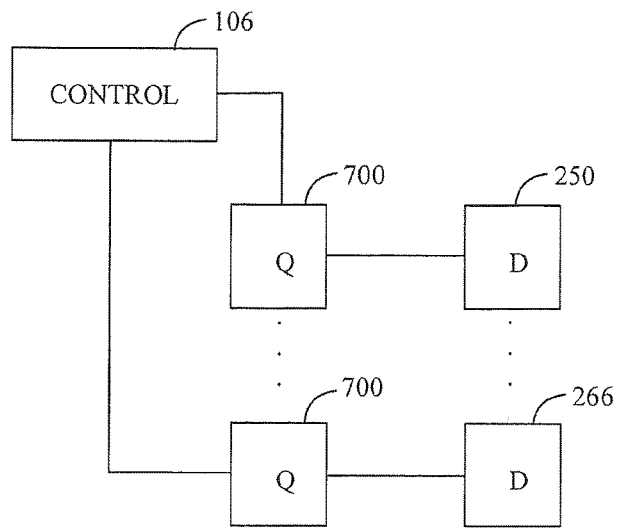
FIG. 7 illustrates an example of quenching.

FIG. 7 presents a quenching circuit 700 in an embodiment where detector elements 250 to 266 are used in the Geiger-mode. When a photon hits a detector element in a Geiger-mode, the detector element has a dead time after each detection, during which the detecting element is not capable of detecting a new photon. The dead time can be shortened or eliminated using a quenching circuit 700 which may be active or passive. A passive quenching circuit may be as simple as a resistor coupled to the detecting element. The passive circuit causes self-quenching of the detector element. An active quenching circuit comprises at least one active component like a transistor. The active quenching circuit detects the breakdown of the detector element and outputs a suitably timed electrical quenching pulse to the detector element for recovering the detector element 250 to 266 quickly back to the detecting state.

Figure 8:
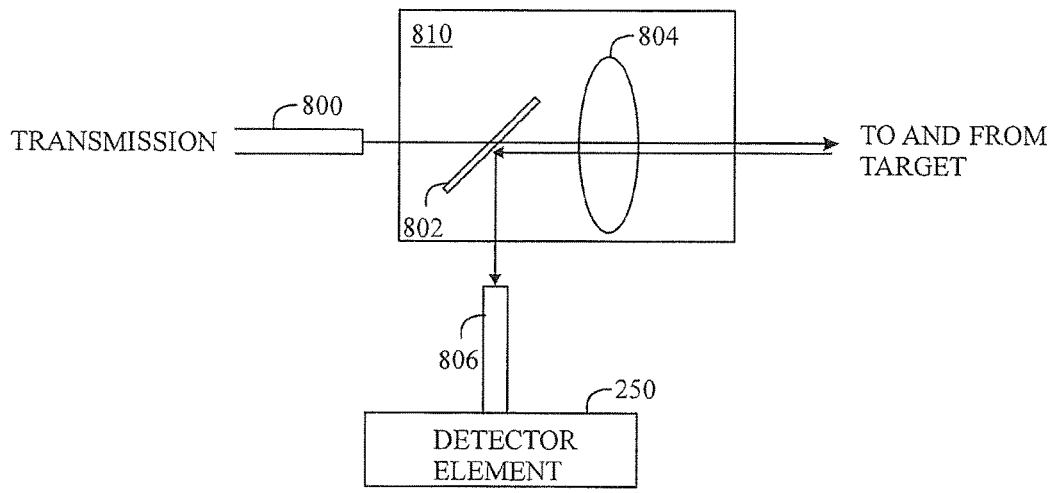
FIG. 8 illustrates an example of uniaxial configuration of the distance measurement apparatus.

FIG. 8 illustrates a uniaxial/coaxial measurement principle of the distance measuring apparatus 100 when it uses only a single SPAD detector element 250. Additionally, FIG. 8 illustrates the use of optical fibers. In an embodiment, the optical pulse may be transmitted using an optical fiber 800 of a pig-tailed laser, although the optical fiber is not necessary. The pig-tailed laser as such may also be used when an array 200 of a plurality of detector element 250 to 266 is used. After leaving the fiber 800 the optical pulse passes through a partially transparent mirror 802 or the like and at least one lens 804. The lens 804 may control the shape of the beam of the pulse, for example. When the reflection of the optical pulse comes back, the optical pulse passes through the lens 804 and propagates to the partially transparent mirror 802 or the like which reflects a part of the optical pulse towards a receiving fiber 806 which guides the optical pulse to the single detector element 250. The receiving fiber 806 may not necessarily be needed but the optical pulse may reflect directly from the partially transparent mirror 802 or the like to the detector element 250. The detector element 250 may be non-active when the optical pulse is transmitted to avoid undesirable detection of the transmitted optical pulse by the detector element 250. This feature may be combined with the adaptive time-gating, for example. The undesirable detection may be caused by a reflection from the partially transparent mirror 802 or the like because the transmitted optical pulse has a high power. The detection of the transmitted optical would cause a dead time for the single detector element 250 and during the dead time the single detector element 250 cannot perform a detection. After the optical pulse has been transmitted the single detector element 250 may be activated. The activation may be performed in a much shorter time after the moment of transmission of the optical pulse than the dead time of the single SPAD detector element 250. Although the above explanation refers to a single detector element 250, the uniaxial measurement principle of FIG. 8 and the time-gating for avoiding the undesirable detection of the transmitted optical pulse may be also applied to the array 200 of a plurality of detector elements 250 to 266. Thus in this embodiment, the measurement apparatus may comprise an uniaxial optical part 810 which is common for the transmitter unit 102 and the receiver unit 104 for transmitting and receiving the optical measurement pulse.

Figure 9:
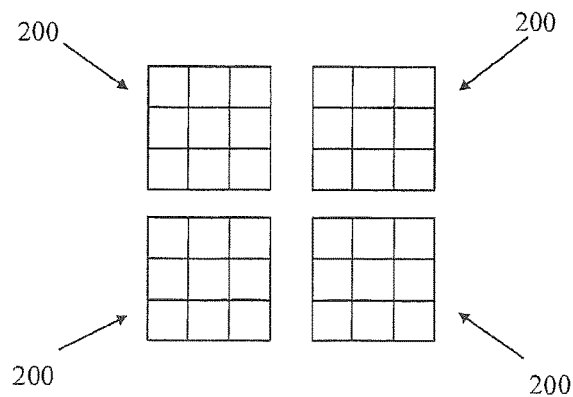
FIG. 9 illustrates an example of 3D detection.

In an embodiment shown in FIG. 9, the detector 105 may comprise a plurality of the arrays 200 which may cover the field of view of the optical distance measurement apparatus or at least a large part of it for three dimensional (3D) range finding. In this manner, it may be possible to detect how far different parts of the target 112 and/or the environment are. By the time gating it would then be possible to limit the detections to distances which are of interest. That would limit the environmental noise which easily causes disturbing dead times to the detector elements of the arrays 200. Of course, it may be possible to use only one array 200 which can cover the same field of view of as the plurality of the arrays 200.

Figure 10:
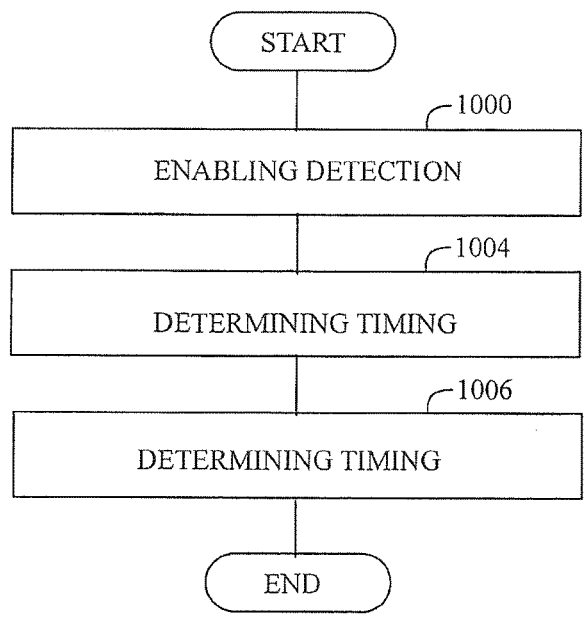
FIG. 10 illustrates an example of the measurement method.

FIG. 10 illustrates the measurement method. In step 1000, at least one single photon avalanche detector element 250 to 266 of a Geiger mode is enabled to detect a photon in at least one time-gated window 400, each of the at least one single photon avalanche detector element 250 to 266 outputting an electric pulse in response to detection of a photon of optical radiation within the at least one time-gated window 400. In step 1002, timing of said electric pulse is determined by a time-to-digital converter circuit 208. In step 1004, a distance of the target is determined in the measuring unit 106 on the basis of the timing of said electric pulse provided by the time-to-digital converter circuit 206.

Figure 11:
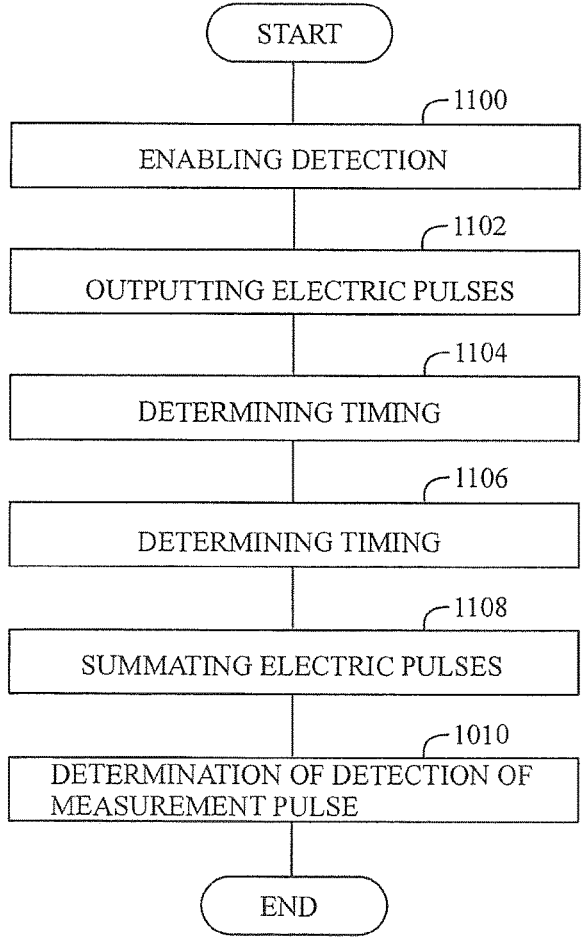
FIG. 11 illustrates an example of another measurement method.

FIG. 11 illustrates the measurement method. In step 1100, an optical measurement pulse is transmitted from a distance measuring device 100 towards a target 112. In step 1102, a time-of-flight of the optical pulse between the distance measuring device 100 and the target 112 is measured on the basis of a moment of a transmission of the measurement pulse and a moment of a detection of the measurement pulse. In step 1104, an electric pulse in response to a photon of optical radiation is output by each of single photon avalanche detector elements 250 to 266 of an array 200 in a Geiger mode for detection. In step 1106, the electric pulses of all detector elements 250 to 266 are combined. In step 1108, it is determined that the measurement pulse is detected if the combination of the electric pulses crosses a predetermined threshold 310.

The measuring unit 106 may comprise the memory 108 to store computer programs (software) configuring the measuring unit 106 to perform the above-described functionalities of the distance measuring apparatus 100. The user interface 190 may comprise a display, a keypad or a keyboard, a loudspeaker, etc.

In an embodiment, the device implementing aspects of the above solution may partly be realized as software, or computer program.

In an embodiment, the apparatus implementing aspects of the above solution may be realized as software in the measuring unit 106.

The computer programs may be in a source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as the technology advances, the inventive concept can be implemented in various ways. The invention and its embodiments are not limited to the examples described above but may vary within the scope of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A receiver unit of an optical time-of-flight distance measuring device, wherein the receiver unit comprises at least one single photon avalanche detector element of a Geiger mode and a time-to-digital converter circuit;
   each single photon avalanche detector element is enabled to detect a photon in at least one time-gated window, and each enabled single photon avalanche detector element is configured to output an electric pulse in response to detection of a photon of optical radiation within the at least one time-gated window;
   the time-to-digital converter circuit, which is configured to count the number of oscillations between a transmission of an optical pulse and a reception of the optical pulse, is configured to provide timing data associated with said electric pulse for determination of a distance of a target on the basis of said timing data.

2. A receiver unit according to claim 1, wherein the receiver unit comprises an array of time-gated single photon avalanche detector elements of the Geiger mode, a comparator and a summating unit; and
   the summating unit is configured to summate concurrent electric pulses from all the detector elements separately in the at least one time-gated window;
   the comparator is configured to determine that a measurement pulse for measuring a distance of the target is detected if the summated concurrent electric pulses of a time-gated window crosses a predetermined threshold.

3. A receiver unit according to claim 2, wherein the time-to-digital converter circuit is configured to provide timing data associated with the summated the electric pulses crossing the predetermined threshold for determination of the distance of the target on the basis of the timing data.

4. A receiver unit according to claim 2, wherein the time-to-digital converter circuit is configured to provide timing data associated with the electric pulses from the detector elements; and the comparator is configured to determine that a measurement pulse for measuring a distance of the target is detected if the summated timings of the concurrent electric pulses crosses a predetermined threshold for determination of the distance of the target on the basis of the timing data provided by the time-to-digital converter circuit.

5. A receiver unit according to claim 2, wherein the receiver unit is configured to compare the summations of the electric pulses of at least two successive moments, and determine that the measurement pulse is detected if the summated electric pulses at a second moment is higher than that at a first moment, the summated electric pulses at the both moments cross the predetermined threshold and a slope between the successive moments crosses a predetermined slope threshold.

6. A receiver unit according to claim 1, wherein the predetermined threshold is based on at least one of the following: background optical radiation received by the array and noise of the array.

7. A receiver unit according to claim 2, wherein the summating unit is configured to summate the number of the electric pulses of all detector elements, and the comparator is configured to determine that a measurement pulse is detected if the sum of the number of the electric pulses crosses the predetermined number threshold.

8. A receiver unit according to claim 2, wherein the summating unit is configured to combine strengths of the electric pulses of all detector elements, and the comparator is configured to determine that a measurement pulse is detected if the combination of the strengths of the electric pulses crosses the predetermined strength threshold.

9. A receiver unit according to claim 1, wherein different detector elements or different groups of detector elements are separately and successively enabled in time-gated windows with respect to transmission of one optical pulse.

10. A receiver unit according to claim 1, wherein a detector element or a group of detector elements is enabled in a time-gated window with respect to a transmission of an optical pulse and another detector element or another group of detector elements is enabled in a time-gated window with respect to a transmission of another optical pulse.

11. A receiver unit according to claim 1, wherein the time-to-digital converter circuit is configured to determine timing of the time-gated windows and provide timing data associated with said electric pulse on the basis of the timing of a time-gated window during which said electric pulse is output.

12. An optical time-of-flight distance measurement device, wherein the measurement device comprises a transmitting unit configured to transmit an optical measurement pulse towards a target, a receiver unit, a time-to-digital converter circuit and a processing unit for performing a measurement of a time-of-flight on the basis of a moment of a transmission of the measurement pulse and a moment of a detection of the measurement pulse, and the receiver unit comprises
   at least one single photon avalanche detector element of a Geiger mode;
   each single photon avalanche detector element is enabled to detect a photon in at least one time-gated window, and each enabled single photon avalanche detector element is configured to output an electric pulse in response to detection of a photon of optical radiation within the at least one time-gated window;
   the time-to-digital converter circuit, which is configured to count the number of oscillations between a transmission of an optical pulse and a reception of the optical pulse, is configured to provide timing data associated with said electric pulse, and the processing unit is configured to determine a distance of the target on the basis of the timing data provided by the time-to-digital converter circuit.

13. The distance measurement device of claim 12, wherein the distance measurement device comprises an array of single photon avalanche detector elements of the Geiger-mode, a summating unit and a comparator and;
each of the single photon avalanche detector elements of the array is configured to output an electric pulse in response to detection of a photon of optical radiation; and
the summating unit is configured to summate concurrent electric pulses from all the detector elements;
the comparator is configured to determine that a measurement pulse for measuring a distance of the target is detected if the combination of the concurrent electric pulses crosses a predetermined threshold.

14. The distance measurement device of claim 13, wherein the time-to-digital converter circuit is configured to provide timing data associated with the summated the electric pulses.

15. The distance measurement device of claim 13, wherein the time-to-digital converter circuit is configured to provide timing data associated with the electric pulses from the detector elements; and
the comparator is configured to determine that a measurement pulse for measuring a distance of the target is detected if the summated timings of the concurrent electric pulses crosses a predetermined threshold for determination of the distance of the target on the basis of the timing data provided by the time-to-digital converter circuit.

16. A method of distance measurement, the method comprising
enabling at least one single photon avalanche detector element of a Geiger mode to detect a photon in at least one time-gated window, each of the at least one enabled single photon avalanche detector element outputting an electric pulse in response to detection of a photon of optical radiation within the at least one time-gated window;
determining timing of said electric pulse by a time-to-digital converter circuit by counting the number of oscillations between a transmission of an optical pulse and a reception of the optical pulse; and
determining, in the measuring unit, a distance of the target on the basis of the timing of said electric pulse provided by the time-to-digital converter circuit.

17. The method of claim 16, wherein the receiver unit comprises an array of single photon avalanche detector elements of the Geiger-mode, the method further comprising:
outputting, by each of single photon avalanche detector elements of an array in a Geiger mode, an electric pulse in response to a photon of optical radiation;
summating the concurrent electric pulses of all detector elements; and
determining that the measurement pulse is detected if the summated concurrent the electric pulses crosses a predetermined threshold.

18. A method according to claim 17, the method further comprising enabling different detector elements or different groups of detector elements separately and successively in time-gated windows with respect to transmission of one optical pulse.

19. A method according to claim 17, the method further comprising enabling a detector element or a group of detector elements in a time-gated window with respect to a transmission of an optical pulse and enabling another detector element or another group of detector elements in a time-gated window with respect to a transmission of another optical pulse.

20. A method according to claim 17, the method further comprising determining, by the time to-digital converter circuit, timing of the time-gated windows for providing timing data associated with said electric pulse on the basis of the timing of a time-gated window during which said electric pulse is output.

* * * * *